United States Patent
Kuriki (10) Patent No.: US 8,602,410 B2
(45) Date of Patent: Dec. 10, 2013

(54) SHEET STACKABLE DEVICES

(75) Inventor: Yuichiro Kuriki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 13/606,589

(22) Filed: Sep. 7, 2012

(65) Prior Publication Data

US 2013/0056923 A1    Mar. 7, 2013

(30) Foreign Application Priority Data

Sep. 7, 2011    (JP) ................................ 2011-195067

(51) Int. Cl.
*B65H 1/00*    (2006.01)
(52) U.S. Cl.
USPC .......................................................... 271/171
(58) Field of Classification Search
USPC ................................ 271/145, 171
See application file for complete search history.

(56) References Cited

U.S. PATENT DOCUMENTS

| | | | |
|---|---|---|---|
| 2010/0053701 | A1 | 3/2010 | Yoshida et al. |
| 2011/0163495 | A1* | 7/2011 | Aoyama et al. ............... 271/241 |
| 2012/0187622 | A1* | 7/2012 | Kamichi ....................... 271/171 |

FOREIGN PATENT DOCUMENTS

| | | | |
|---|---|---|---|
| JP | 02-066549 | A | 5/1990 |
| JP | 2000-128362 | A | 5/2000 |
| JP | 2001-139156 | A | 5/2001 |
| JP | 2002-154669 | A | 5/2002 |
| JP | 2010-062839 | A | 3/2010 |

* cited by examiner

*Primary Examiner* — David H Bollinger
(74) *Attorney, Agent, or Firm* — Banner & Witcoff, Ltd.

(57) ABSTRACT

A sheet stackable device including a first tray having a first placement plane, a second tray having a second placement plane and a slider groove, the second tray being swingable about a swing axis between a first position and a second position, a first guide arranged on the first placement plane, a second guide arranged on the second placement plane, a first projection provided in the second guide and formed to project from the first guide or the second guide, and a joint allowing relative swing movement between the first guide and the second guide about the swing axis, is provided. A height of the joint is smaller than a height of the first projection. The first tray and the second tray form an opening in a position between edges of the first tray and the second tray when the second tray is in the first position.

11 Claims, 8 Drawing Sheets

SHEET STACKABLE DEVICES

CROSS REFERENCE TO RELATED APPLICATION

This application claims priority from Japanese Patent Application No. 2011-195067, filed on Sep. 7, 2011, the entire subject matter of which is incorporated herein by reference.

BACKGROUND

1. Technical Field

An aspect of the present disclosure relates to a sheet stackable device.

2. Related Art

A sheet stackable device is disclosed in, for example, Japanese Patent Provisional Publication No. 2010-62839. According to the disclosure in the publication, the sheet stackable device includes a first tray having a first placement plane and a second tray having a second placement plane. The second tray is formed in a shape of a flat plate and has a slider groove, which extends in a widthwise direction. The second tray is movable to swing about a swing axis, which extends in parallel with a widthwise direction of a sheet being conveyed in the sheet stackable device, from a first position to second position. The first position is a position, in which the second tray is above the first tray and the second placement plane faces downward. The second position is an upstream position along the sheet conveying direction with respect to the first placement plane of the first tray and in which the second placement plane faces upward. When the second tray is in the second position, the first placement plane and the second placement plane make parts of a sheet stackable plane of the sheet stackable device.

According to the disclosure in the above-referenced publication, the sheet stackable device includes a first guide, which is arranged on the first placement plane and restricts a widthwise position of the sheet on the sheet stackable plane, and a second guide, which is arranged on the second placement plane to be slidable along the slider groove and restricts the widthwise position of the sheet on the sheet stackable plane. The sheet stackable device further includes a joint, which connects the first guide and the second guide with each other. According to the publication, the first guide, the second guide, and the joint are indicated by reference signs 42a, 42b, and 44, respectively.

The joint allows the first guide and the second guide to relatively swing about a swing axis with respect to each other and allows the first guide to slide in the widthwise direction integrally with the second guide.

SUMMARY

In the sheet stackable device, as shown in FIGS. 5 and 6 in the above-referenced publication, a height of the joint 44 along a direction orthogonal to the second placement plane of the second tray, when the second tray is in the second position, is greater than a height of the first guide 42a and than a height of the second guide 42b along the orthogonal direction. Therefore, when the second tray is in the second position as shown in FIG. 4, an amount of clearance (an opening), which is created between edges of the first tray and the second tray closer to the swing axis, tends to be larger. Accordingly, the sheet stackable device may be restricted from being downsized.

An aspect of the disclosure is advantageous in that a sheet stackable device, which can be downsized, is provided.

According to an aspect of the present disclosure, a sheet stackable device, including a sheet stackable plane configured such that a sheet is placed thereon, is provided. The sheet stackable device includes a first tray having a first placement plane configured to form a part of the stackable plane, a second tray including a second placement plane configured to form a part of the stackable plane with the first placement plane, and a slider groove, the second tray being swingable about a swing axis extending in parallel with a widthwise direction of the sheet, between a first position and a second position, the slider groove extending in parallel with the widthwise direction of the sheet, the first tray and the second tray being configured to form an opening in a position between an edge of the first tray on a side of the swing axis and an edge of the second tray on a side of the swing axis when the second tray is in the first position a first guide arranged on the first placement plane and configured to restrict a widthwise position of the sheet in the widthwise direction, a second guide arranged on the second placement plane and configured to slide along the slider groove in the widthwise direction and restrict the widthwise position of the sheet in the widthwise direction, a first projection provided in the second guide and formed to project from one of the first guide and the second guide in a projecting direction, which is orthogonal to the second placement plane, a joint configured to allow relative swing movement between the first guide and the second guide about the swing axis and configured to connect the first guide and the second guide, the first guide and the second guide being integrally slidable in the widthwise direction, a height of the joint from the second placement plane of the second tray in the projecting direction, when the second tray is in the second position, being smaller than a height of the first projection from the second placement plane of the second tray in the projecting direction.

DETAILED DESCRIPTION

Hereinafter, an image reading apparatus 1 representing a sheet stackable device as an embodiment of the present disclosure will be described with reference to the accompanying drawings. In the following description, orientation concerning the image reading apparatus 1 will be referred to based on directions indicated by arrows shown in each drawing. For example, a side, on which a discharge tray 6 (see FIG. 1) is disposed, will be referred to as front for a user, and the user's left-hand side when the user faces the front side of the image reading apparatus 1 will be referred to as left. A rear side and a right-hand side will be also defined according to the user's view. The right-left direction of the image reading apparatus 1 may also be referred to as a widthwise direction or a direction of sheet-width. The up-down direction in FIG. 1 corresponds to a vertical direction of the image reading apparatus 1. The orientations shown in FIGS. 2-9 correspond to those indicated by the arrows appearing in FIG. 1. In the following description, two or more same or similar parts or components may be referred to by an identical reference sign, and description of one of those same or similar components may represent the remaining components.

Overall Configuration of the Image Reading Apparatus

An overall configuration of the image reading apparatus 1 will be described hereinbelow. As shown in FIGS. 1-4, the image reading apparatus 1 includes a housing 8, a first tray 100, a second tray 200, an image reader unit 7, and a discharge tray 6.

Figure 2:
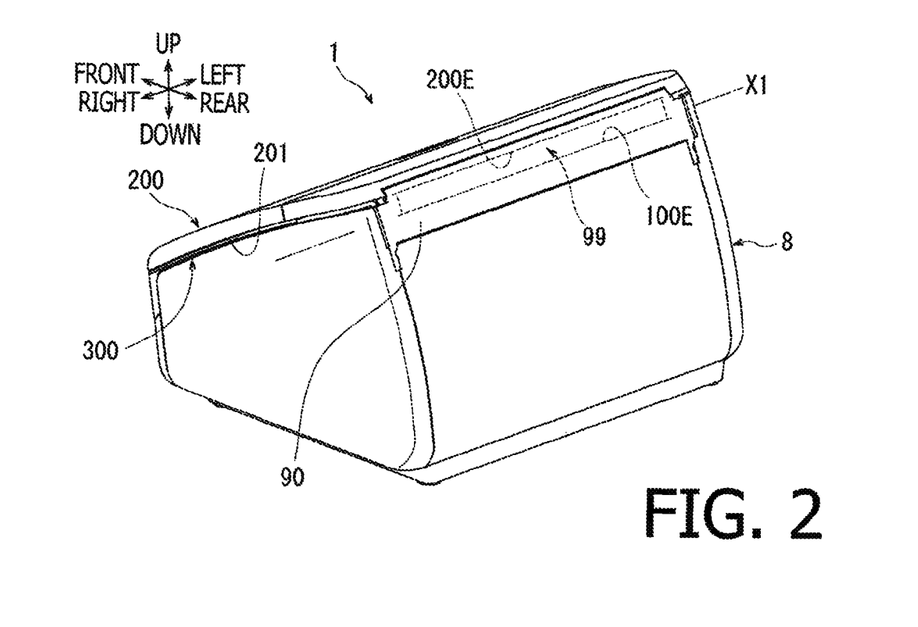
FIG. 2 is a perspective view including a rear face of the image reading apparatus 1 according to the embodiment of the present disclosure with a second tray 200 in a first position.
Figure 3:
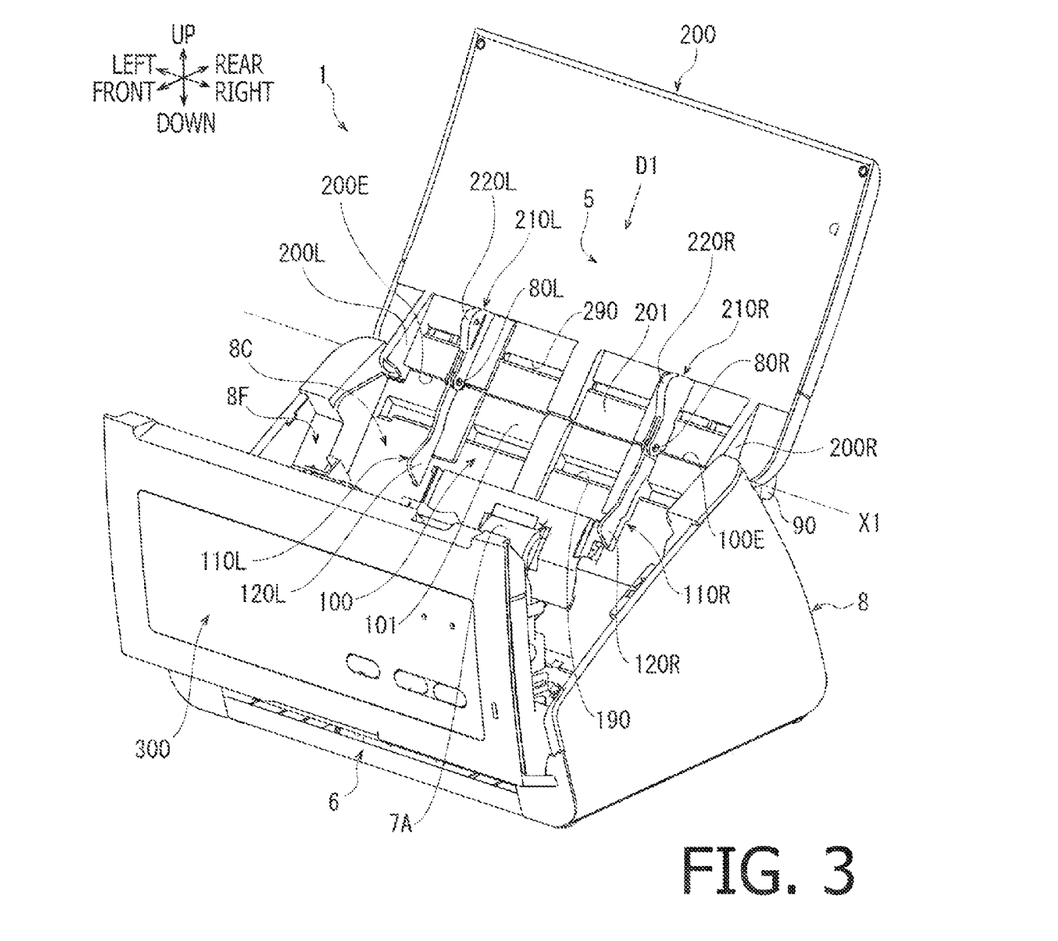
FIG. 3 is a perspective view including the front face of the image reading apparatus 1 according to the embodiment of the present disclosure with an upper cover 300 being open.

The housing 8 is a box-casing which includes an external cover (unsigned), an upper cover 300, and an internal frame 8F (see FIG. 3). The upper cover 300, when in a regular condition, is arranged to incline upward toward the rear of the image reading apparatus 1 (see FIGS. 1, 2, and 4). When the image reading apparatus 1 is in a specific condition, such as in case of sheet-jam or maintenance, the upper cover 300 can be moved to swing and uplift a rear edge thereof to be placed in an open posture (see FIG. 3). When in the open posture, internal structure of the image reading apparatus 1, including an upper wall 8C of the internal frame 8F and a feed roller 7A, can be exposed.

Figure 4:
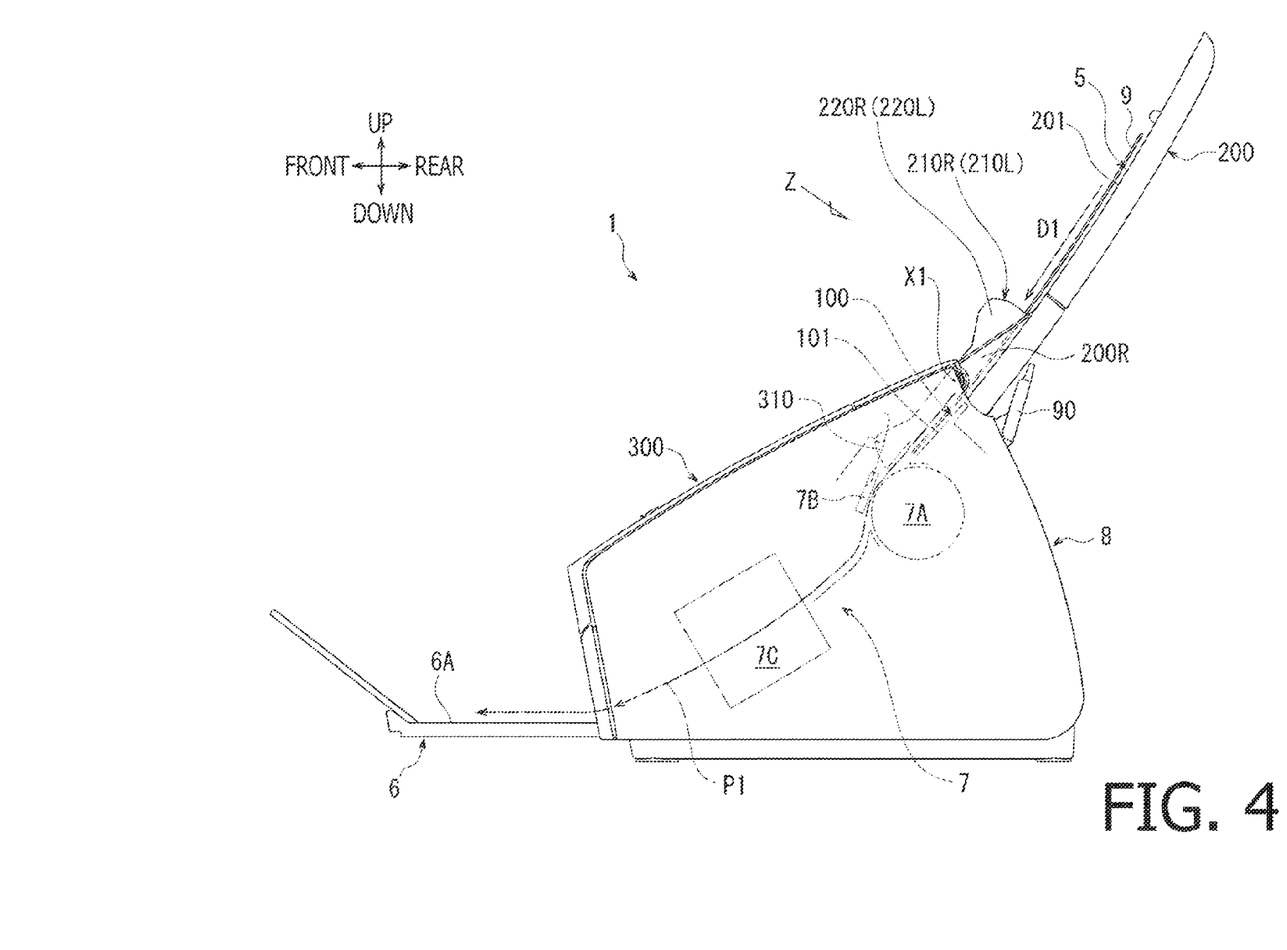
FIG. 4 is a side view of the image reading apparatus 1 according to the embodiment of the present disclosure.

As shown in FIGS. 3 and 4, the first tray 100 being a part of the upper wall 8C in the internal frame 8F is formed in a shape of a thin plate, which is arranged to descend from the rear side of the housing 8 to the feed roller 7A in a sloping posture. In other words, the first tray 100 is formed integrally with the upper wall 8C of the internal frame 8F. An upward sloping surface of the first tray 100 provides a first placement plane 101 in the image reading apparatus 1.

The second tray 200 is formed in a shape of a thin plate, and one of two surfaces of the second tray 200 provides a second placement plane 201 in the image reading apparatus 1. The second tray 200 is formed integrally with a pair of hinges 200R, 200L, which are formed in a right-side corner and a left-side corner of the second tray 200 respectively. The second tray 200 is swingably supported by the housing 8 to swing about a swing axis X1, which extends at an upper rear position of the housing 8 along the widthwise direction.

Figure 1:
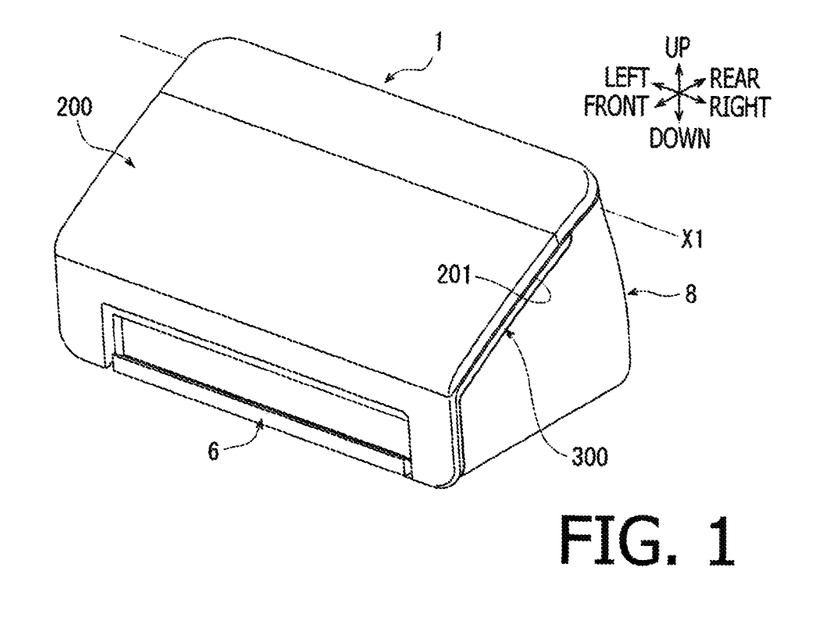
FIG. 1 is a perspective view including a front face of an image reading apparatus 1 according to an embodiment of the present disclosure.

When the image reading apparatus 1 is not in use, the second tray 200 is arranged in an upper position with respect to the housing 8 to cover the housing 8 from above with the second placement plane 201 facing downward (see FIGS. 1 and 2). The position of the second tray 200 shown in FIGS. 1 and 2 may be referred to as a stored position or a first position.

Figure 5:
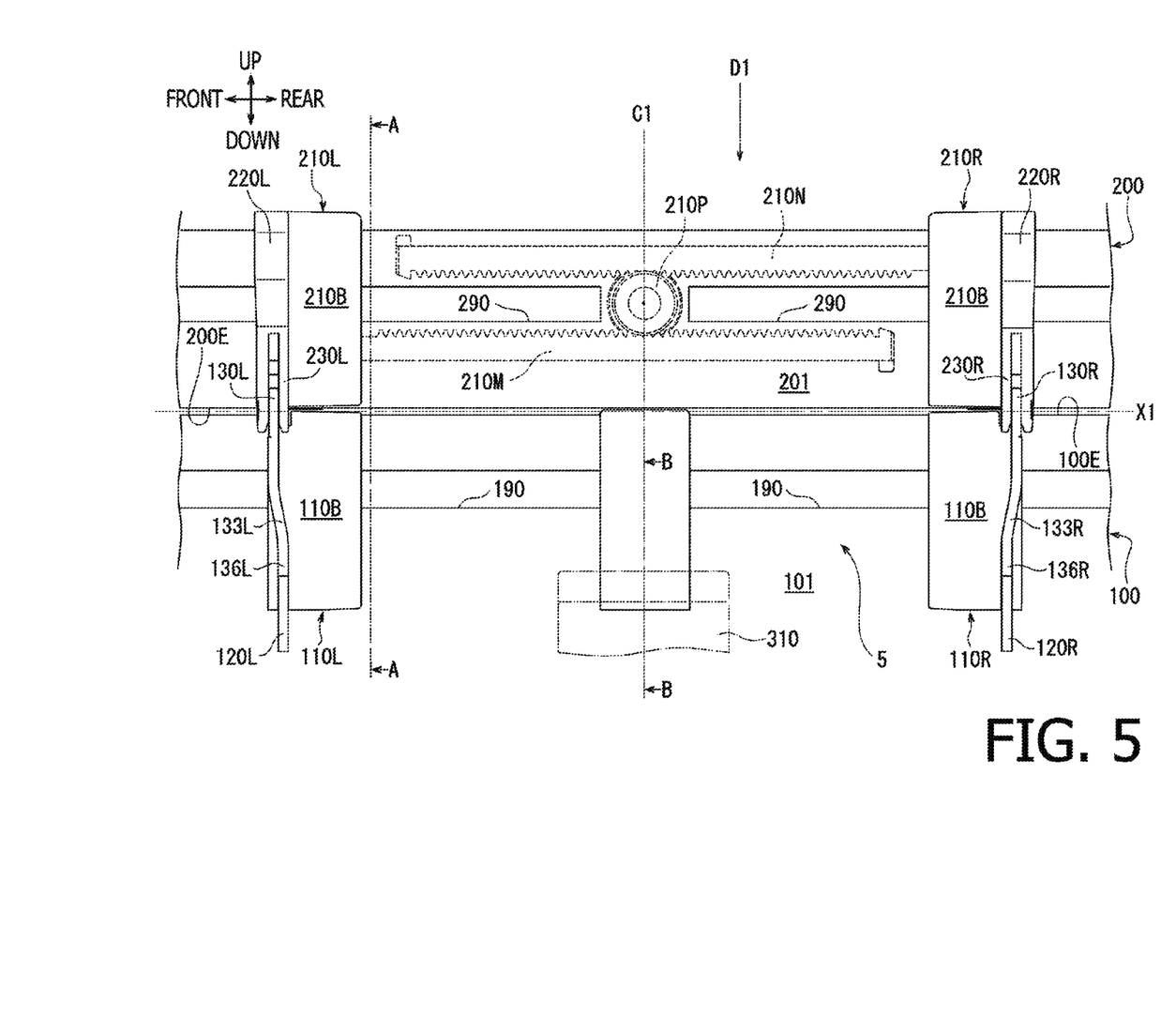
FIG. 5 is an enlarged partial view of the image reading apparatus 1 according to the embodiment of the present disclosure with a first tray 100, the second tray 200, a first guide 110R, 110L, and a second guide 210R, 210L viewed along a direction Z shown in FIG. 4.
Figure 6:
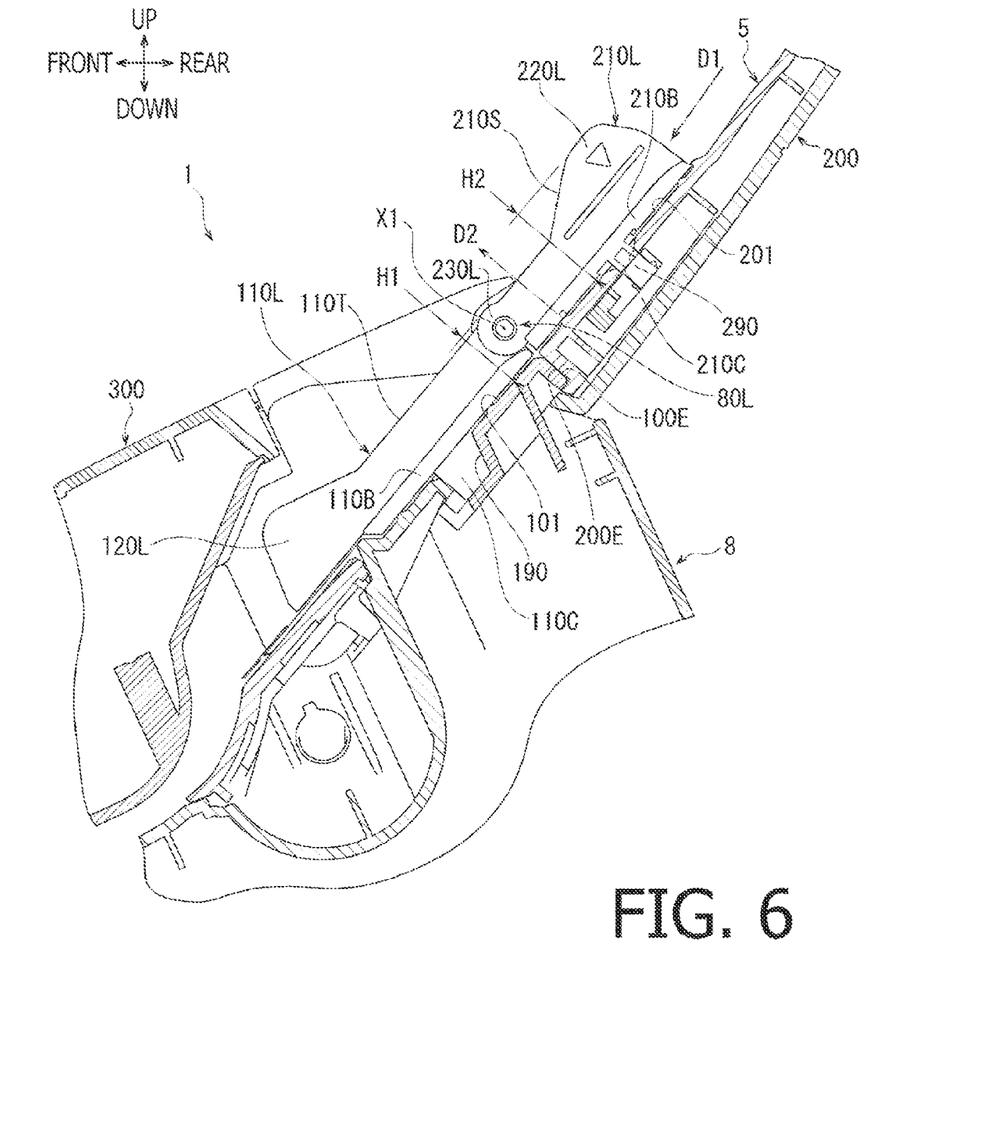
FIG. 6 is a cross-sectional enlarged partial view of the image reading apparatus 1 according to the embodiment of the present disclosure taken along a line A-A shown in FIG. 5.

When the image reading apparatus 1 is used, the user moves the second tray 200 to swing about the swing axis X1 from the first position shown in FIGS. 1 and 2 to a position shown in FIGS. 3 and 4. In the position shown in FIGS. 3 and 4, the second placement plane 201 is placed in a rearward position with respect to the first placement plane 101 to face upward. The position of the second tray 200 shown in FIGS. 3 and 4 may be referred to as a usable position or a second position. When the second tray 200 is in the second position, the first placement plane 101 of the first tray 100 and the second placement plane 201 of the second tray 200 at least partially form a stackable plane 5, which is a nearly flat plane. In this regard, as shown in FIGS. 5 and 6, an edge 100E of the first tray 100 on a side closer to the swing axis X1, amongst edges of the first tray 100 extending in parallel with the swing axis X1, and an edge 200E of the second tray 200 on a side closer to the swing axis X1, amongst edges extending in parallel with the swing axis X1, are in close proximity to contact each other. Thus, the position of the second tray 200 is determined by the contact with the edge 100E of the first tray. On the stackable plane 5, a sheet 9 can be placed (see FIG. 4). When a plurality of sheets 9 are used in the image reading apparatus 1, the plurality of sheets 9 can be stacked on the stackable plane 5.

The image reading unit 7 is a known image reader; therefore, detailed description of the image reading unit 7 is herein omitted. As shown in FIG. 3, the image reading unit 7 is installed inside the housing 8 and attached to the internal structure, such as the internal frame 8F. The image reading unit 7 includes the feed roller 7A, a separator pad 7B, an image reading sensor 7C, and a discharge roller (not shown). The image reading unit 7 conveys the sheet 9 placed on the stackable plane 5 toward lower-front along a conveyer path P1, which extends from the stackable plane 5 in a descending inclination. The image reading unit 7 reads an image appearing on the sheet 9 by the image reading sensor 7C as the sheet 9 is conveyed in the conveyer path P1. The image reading sensor 7C may be, for example, a contact image sensor (CIS) or a charge coupled device (CCD). The image reading unit 7 may have a pair of image reading sensors, which can be placed in opposite positions from each other across the conveyer path P1. With the pair of image reading sensors, images appearing on both sides of the sheet 9 can be read.

The discharge tray 6 can be drawn out of the housing 8 (see FIG. 4) or stored in the housing 8 (see FIG. 1). When the discharge tray 6 is stored in the housing 8, as shown in FIG. 1, the discharge tray 6 is exposed merely at a front end part thereof. When the discharge tray 6 is drawn out of the housing 8 by the user, as shown in FIG. 4, the discharge tray 6 is placed outside the housing 8 with a discharge plane 6A facing upward.

When the image reading unit 7 reads the image from the sheet 9 and forwards the sheet 9 along the conveyer path P1, the sheet 9 is discharged out of the housing 8 and released on the discharge plane 6A. When a plurality of sheets 9 with images are placed on the stackable plane 5, the sheets 9 are conveyed in the conveyer path P1 separately one-by-one, and the images appearing on the sheets 9 are read serially. After having the images read by the image reading sensor 7C, the sheets 9 are discharged serially to be stacked on the discharge plane 6A.

Figure 7:
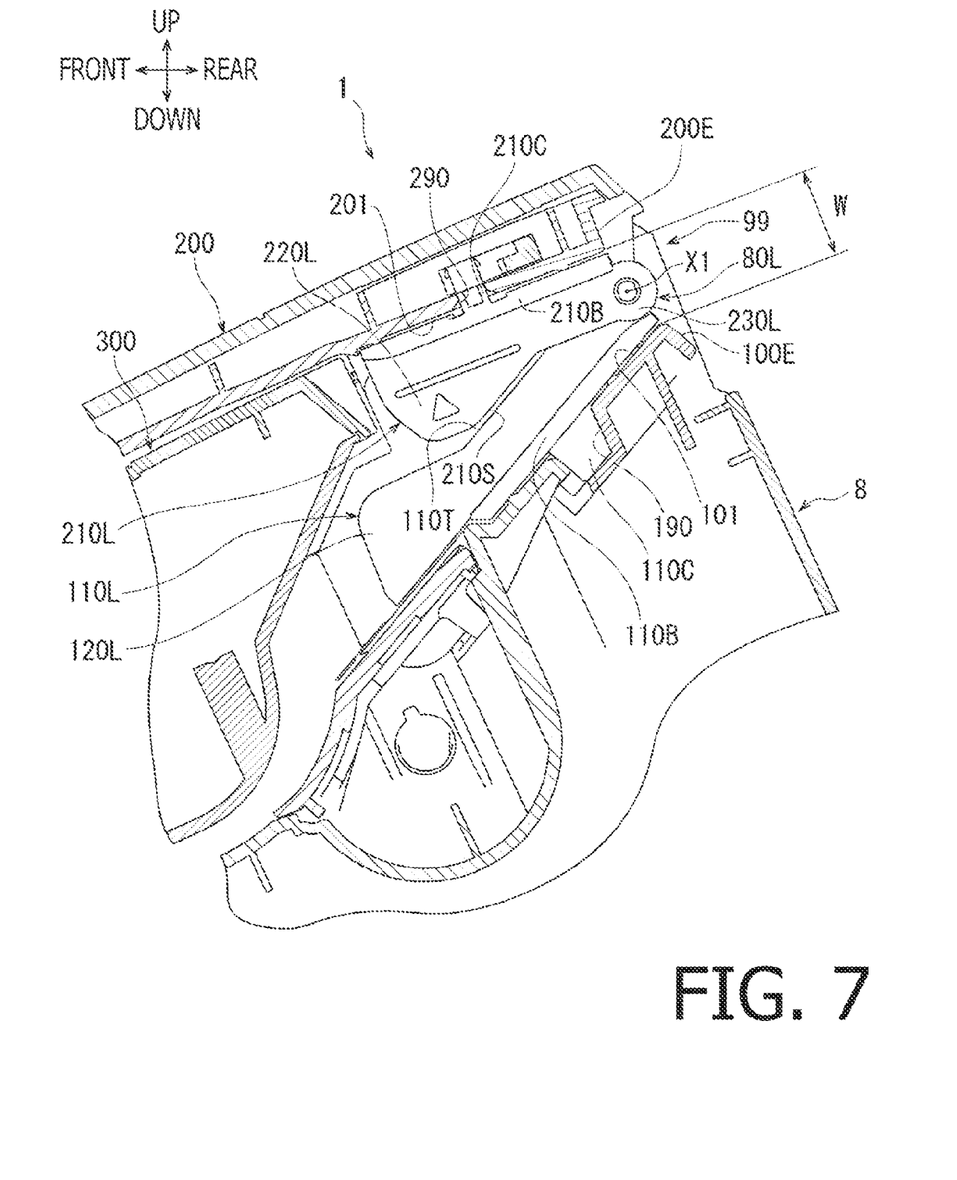
FIG. 7 is a cross-sectional enlarged partial view of the image reading apparatus 1 according to the embodiment of the present disclosure taken along the line A-A shown in FIG. 5 but with the second tray 200 in the first position.

When the second tray 200 is placed in the first position, the edge 100E of the first tray 100 on the side closer to the swing axis X1, amongst edges of the first tray 100 extending in parallel with the swing axis X1, and the edge 200E of the second tray 200 on the side closer to the swing axis X1, amongst edges of the second tray 200 extending in parallel with the swing axis X1, are spaced apart from each other and form an opening 99 (see FIGS. 2 and 7).

As shown in FIG. 2, the image reading apparatus 1 is provided with an opening cover 90, which covers the opening 99 when the second tray 200 is in the first position. The opening cover 90 moves along with the second tray 200, as the second tray 200 swings to the second position, to retract in a lower position with respect to the second tray 200 (see FIGS. 3 and 4). Detailed mechanism of the opening cover 90 moving in coordination with the second tray 200 is, however, herein omitted. Further in FIGS. 6 and 7, illustration of the opening cover 90, which is assumed to be in the lower retracted position, is omitted.

According to the present embodiment, the direction of width of the sheet 9 ("sheet-width") being conveyed along a conveying direction D1 (see FIG. 3) coincides with the right-left direction of the image reading apparatus 1. Meanwhile, the swing axis X1 extends in parallel with the direction of sheet-width and the right-left direction. In this regard, the term "parallel" may mean "substantially parallel", and a term "orthogonal," which may be referred to later, may mean "substantially orthogonal." Further, in the present embodiment, a term "a (the) widthwise inner side" refers to a side closer to a center axis C1, which is a reference axis of the image reading apparatus 1, with respect to a particular point along the widthwise (right-left direction). On the other hand, a term "a (the) widthwise outer side" refers to a side further from the center axis C1 with respect to a particular point along the widthwise (right-left direction).

Width-Positioning Structure for the Sheet Placed on the Stackable Plane

The image reading apparatus 1 includes a first guide 110R, 110L, a second guide 210R, 210L, a first projection 220R, 220L, and a joint 80R, 80L, a second projection 120R, 120L (see FIGS. 5-9). Each of these parts include paired pieces, which are arranged in line-symmetrical widthwise (right and left) positions with each other. The image reading apparatus 1 may further includes a third guide 310. These parts serve to place the sheet 9 in a correct widthwise position on the stackable plane 5 regardless of a size of the sheet 9 in order to convey the sheet 9 correctly in the conveyer path P1 and to have images on the sheet 9 to be read correctly in the image reading apparatus 1 whilst the size of the sheet 9 may vary between, for example, a business-card size and a letter size.

In the image reading apparatus 1, the first guide 110L, the second guide 120L, the first projection 220L, the joint 80L, and the second projection 120L, which are on the left-hand side, and the first guide 110R, the second guide 210R, the first projection 220R, the joint 80R, and the second projection 120R, which are on the right-hand side, are in line-symmetrical widthwise positions respectively with reference to the center axis C1 (see FIG. 5). Therefore, in FIGS. 6-9, the parts on the left-hand side are shown, and illustration of those on the right-hand side is omitted.

Figure 8:
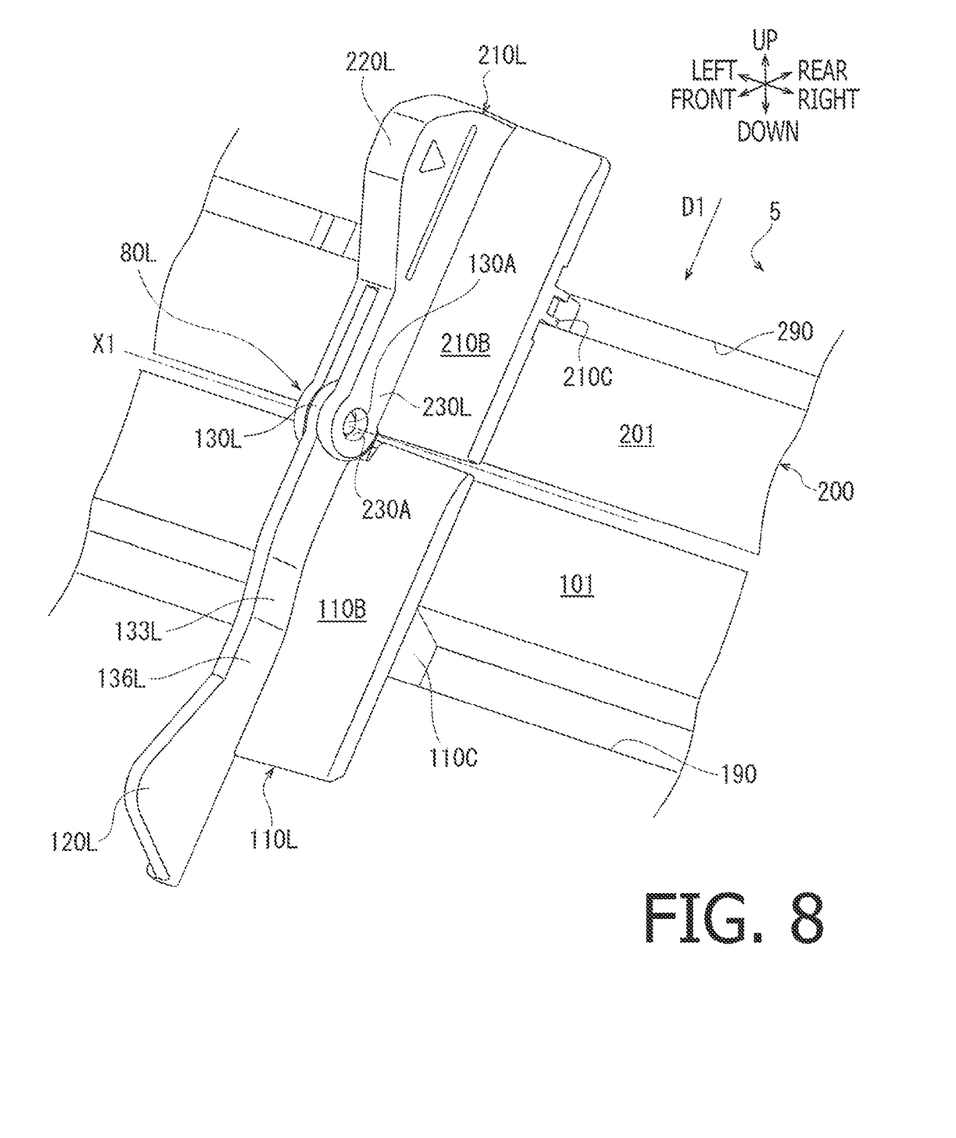
FIG. 8 is a perspective and enlarged partial view of the image reading apparatus 1 including the first guide 110R, 110L and the second guide 210R, 210L according to the embodiment of the present disclosure.

The first guide 110R, 110L is arranged on the first placement plane 101 of the first tray 100 (see FIGS. 5-8). As shown in FIG. 8, the first tray 100 is formed to have a slider groove 190, which extends in the widthwise direction. Each piece of the first guide 110R, 110L has a base 110B, which is a thin plate extending in parallel with the first placement plane (see FIG. 5), and a jut 110C, which projects from the base 110B downward and is inserted in the slider groove 190 (see also FIGS. 6 and 7). As the jut 110C slides in the slider groove 190, the base 110B slides along the first placement plane 110, and the first guide 110R, 110R slides in the widthwise direction.

It is to be noted the "slider groove" refers to a structure, which allows the first guide 110R, 110L to slide in the widthwise direction, and may not necessarily be a groove but may include, for example, a hole, an opening, and a cutout being formed in the first tray 100. Similarly, a slider groove 290, which will be described later, refers to a structure which allows the second guide 210R, 210L to slide in the widthwise direction and may include a hole, an opening, and a cutout being formed in the second tray 200.

Each piece of the first guide 110R, 110L further has an interpolated portion 130R, 130L, a connecting portion 133R, 133L, and a restrictive portion 136R, 136L respectively (see FIGS. 5 and 8). The interpolated portion 130R, 130L protrudes from the base 110B orthogonally with respect to the first placement plane 101 in a shape of a bulkhead. The interpolated portion 130R, 130L extends from a position at an upstream end of the first guide 110R, 110L, which is a position to intersect with the swing axis X1, toward a downstream of the conveyer direction D1. The connecting portion 103R, 103L is formed continuously from the interpolated portion 130R, 130L in a shape of a bulkhead to extend toward the downstream in the conveying direction D1. The restrictive portion 136R, 136L is formed continuously from the connecting portion 130R, 130L in a shape of a bulkhead to extend toward the downstream in the conveying direction D1.

As shown in FIG. 5, the connecting portion 133R, 133L is curved inward in a crank shape, when viewed from a view point to face the first placement plane 101; therefore, the restrictive portion 136R, 136L is in widthwise inner side position with respect to the interpolated portion 130R, 130L.

Each piece of the second guide 210R, 210L is arranged on the second placement plane 201 of the second tray 200 (see FIGS. 5-8). As shown in FIG. 8, the second tray 200 is formed to have a slider groove 290, which extends along the widthwise direction. The second guide 210R, 210L has a base 210B, which is a thin plate extending in parallel with the second placement plane (see FIG. 5), and a jut 210C, which projects from the base 210B downward to be inserted in the slider groove 290. As the jut 210C slides in the slider groove 290, the base 210B slides along the second placement plane 210, and the second guide 210R, 210R slides in the widthwise direction.

The second guide 210L on the left-hand side has a rack 210M, which extends in parallel with the slider groove 290 in a lower position with respect to the second placement plane 201 on the widthwise inner side (see FIG. 5). The second guide 210R on the right-hand side has a rack 210N, which extends in parallel with the slider groove 290 in a lower position with respect to the second placement plane 201 on the widthwise inner side. The rack 210M, 210N is interlocked with a pinion gear 210P, which is arranged on the center axis C1 in a lower position with respect to the second placement plane 201.

With the above configuration, when one of two pieces of the second guide 210R, 210L is slidably moved outward or inward along the widthwise direction for an amount, the slide movement is transmitted to the other piece of the second guide 210R, 210L via the racks 210M, 210N, and the pinion gear 120P. Accordingly, the other piece of the second guide 210R, 210L is slidably moved outward or inward along the widthwise direction for the same amount. In other words, a distance between the second guide 210R and the center axis C1 and a distance between the second guide 210L and the center axis C1 are maintained equal to each other at all time.

The second guide 210R, 210L is formed to have a first projection 220R, 220L and a bifurcated portion 230R, 230L (see FIGS. 5 and 6). Each piece of the first projection 220R, 220L projects from the base 110B in a projecting direction D2, which is orthogonal to the second placement plane 201.

The first projection 220R, 220L projects from the slider groove 290 formed in the second tray 200. In the present embodiment, the expression "project from the slider groove 290" may mean "project from an area in the vicinity of the slider groove 290." The area in the vicinity of the slider groove 290 may refer to, for example, a range at least including an area above the slider groove 290 along the projecting direction D2.

As shown in FIG. 4, when the second tray 200 in the second position is viewed along the widthwise direction, the first projection 220R, 220L is exposed out of the upper cover 300 and the stackable plane 5. Therefore, even when the second guides 210R, 210L are in outermost positions in the widthwise range on the second tray 200, the first projection 220R, 220L can easily be pinched by a hand of the user at the exposed part. When the user pinches one of two pieces of the first projection 220R, 220L and moves the piece inward or outward in the widthwise direction, the second guide 210R, 210L slides inward or outward accordingly.

The bifurcated portion 230R, 230L is formed to extend from the first projection 220R, 220L in two-split pieces toward the downstream in the conveying direction D1 (see FIGS. 5 and 8). As shown in FIG. 8, each piece of the bifurcated portion 230R, 230L has a round opening 230A, which is coaxially with the swing axis X1.

In a position between the two-split pieces in the bifurcated portion 230, 230L, the interpolated portion 130R, 130L are inserted respectively (see FIGS. 5 and 8). As shown in FIG. 8, the interpolated portion 130R, 130L is formed to have a shaft 130A, which is coaxially inserted in the round holes 230A of the bifurcated portion 230R, 230L.

The joint 80R, 80R including, but not limited to, the bifurcated portion 230R, 230L and the interpolated portion 130R, 130L, is thus provided. With the above-described configuration, the joint 80R, 80L allows relative movement between the first guide 110R, 110L and the second guide 210R, 210L, which rotate with respect to each other about the swing axis X1 between the position shown in FIGS. 6, 8 and the position shown in FIG. 7. When the second guide 210R, 210L slides in the widthwise direction, the sliding movement is transmitted to the first guide 110R, 110L via the interpolated portion 130R, 130L, which is inserted between the two-split pieces of the bifurcated portion 203R, 230L. Therefore, the first guide 110R, 110L can slide integrally with the second guide 210R, 210L in the widthwise direction.

As shown in FIG. 5, a lateral face of the first projection 220R, 220L facing the widthwise inner side, a lateral face of the bifurcated portion 230R, 230L facing the widthwise inner side, and a lateral face of the restrictive portion 136R, 136L facing the widthwise inner side are at a same distance from the center axis C1. In other words, the lateral face of the first projection 220R, 220L facing the widthwise inner side, the lateral face of the bifurcated portion 230R, 230L facing the widthwise inner side, and the lateral face of the restrictive portions 136R, 136L facing the widthwise inner side align in line which is in parallel with the conveying direction D1. Therefore, the first projection 220R, 220L, the bifurcated portion 230R, 230L, and the restrictive portion 136R, 136L can equally restrict the widthwise position of the sheet 9. In this regard, it is to be noted that the connecting portion 133R, 133L is curved in the crank-shape; therefore, the sheet 9 being conveyed can be smoothly placed in the widthwise correct position without being caught by the first guide 110R, 110L.

As shown in FIG. 6, when the second tray 200 is in the second position, a height of the joint 80R, 80L from the second placement plane 201 in the projecting direction D2 is referred to as a height H1. Meanwhile, a height of the first projection 220R, 220L from the second placement plane 201 in the projecting direction D2 is referred to as a height H2. The height H1 is smaller than the height H2.

Further, as shown in FIG. 6, when the second tray 200 is in the second position, an upper edge of a part of the connecting portion 133R, 133L, which extends from the joint 80R, 80L toward the downstream in the conveying direction D1, in the first guide 110R, 110L, is referred to as an upper edge 110T. Meanwhile, an oblique edge extending from the first projection 220R, 220L toward the joint 80R, 80L in the second guides 210R, 210L is referred to as an oblique edge 210S. As shown in FIG. 7, when the second tray 220 is placed in the first position, the upper edge 110T and the oblique edge 210S are in adjacent positions to each other with a small amount of clearance remaining in there-between and extend in parallel with each other.

As shown in FIGS. 6 and 8, the first guide 110R, 110L is formed to have a second projection 120R, 120L, which projects from the restrictive portion 136R, 136L respectively in a direction orthogonal with respect to the first placement plane 101, at a downstream position along the conveying direction D1. The second projection 120R, 120L is formed in a shape of a triangle, when viewed along the widthwise direction, and is arranged to have a top corner of the triangle protruded in adjacent to a lower plane of the upper cover 300, which is in an upper position with respect to the first placement plane 101.

Figure 9:
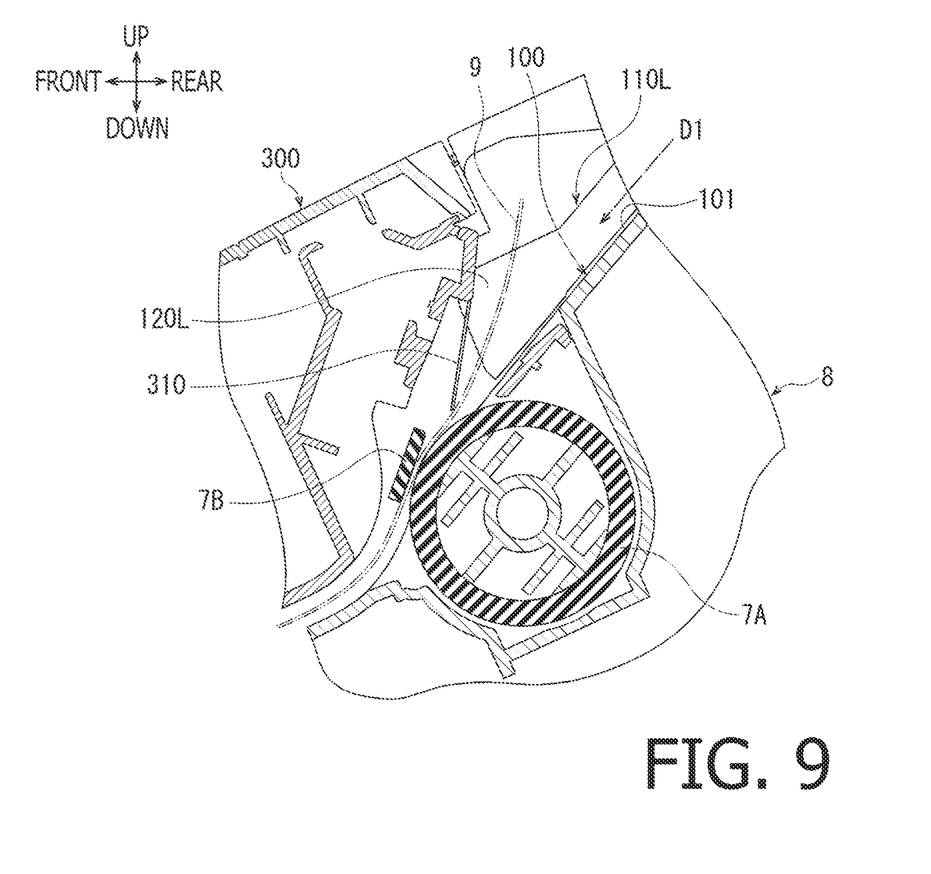
FIG. 9 is a cross-sectional enlarged partial view of the image reading apparatus 1 according to the embodiment of the present disclosure taken along a line B-B shown in FIG. 5.

The upper cover 300 is, as shown in FIGS. 4 and 9, arranged in an upper position with respect to the feed roller 7A and includes the third guide 310, which faces the first placement plane 101. The third guide 310 is a blade spring made of a thin metal plate and is arranged in an angled posture with an open end thereof hanging closer to the feed roller 7A and toward the downstream in the conveying direction D1. With this arrangement, the third guide 310 can restrict the sheet 9 from being separated from the feed roller 7A as the sheet 9 is conveyed from the placement plane 5.

In FIG. 5, the position of the third guide 310, which is arranged in the upper position with respect to the first placement plane 101, is indicated in double-dotted line. The second projection 120R, 120L is arranged in a widthwise outer side position to interpose the third guide 310 in there-between. As shown in FIG. 9, when viewed along the widthwise direction, the second projection 120R, 120L and the third guide 310 coincide with each other at least partially.

Effects of the Present Disclosure

According to the image reading apparatus 1 described above, as shown in FIG. 6, when the second tray 200 is in the second position, the height H1 of the joint 80R, 80L in the projecting direction D2 is smaller than the height H2 of the first projection 220R, 220L in the projecting direction D2. Therefore, as shown in FIG. 7, an amount of the opening 99, which is created when the second tray 200 is in the first position can be reduced. In other words, a distance W between the edge 100E of the first tray 100 on the side closer to the swing axis X1 and the edge 200E of the second tray 200 on the side closer to the swing axis X1 can be reduced. Accordingly, the image reading apparatus 1 can be downsized.

According to the image reading apparatus described above, the first projection 220R, 220L is arranged to project in the projecting direction D2 from the slider groove 290, which is formed in the second tray 200 (see FIGS. 6 and 8). Therefore, when the first projection 220R, 220L is pinched by the user to slide the second guide 210R, 210L along the slider groove 290, stress to urge the second guide 210R, 210L tends not be transmitted to the slider groove 290. Rather, the second guide 210R, 210L can be slidably moved smoothly.

Further, according to the image reading apparatus 1 described above, when the second tray 200 is in the first position, the oblique edge 210S is placed in a position to become in parallel with the upper edge 110T of the first guide 110R, 110L (see FIG. 7). In other words, the form of the second guide 210R, 210L fits the form of the first guide 110R, 110L. Therefore, the first guide 110R, 110L and the second guide 210R, 210L can be placed in the positions adjacent to each other. Accordingly, the size of the opening 99 can be effectively reduced, and the image reading apparatus 1 can be downsized.

According to the image reading apparatus 1 described above, further, the third guide 310 to guide the sheet 9 to the feed roller 7A is provided. The third guide 310 is arranged to at least partially coincide with the second projection 120R, 120L when viewed along the widthwise direction. Without the third guide 310, when a sheet 9 with resiliency is conveyed, a rear end part of the sheet 9 may be curled upward and float outside the guidable range of the first guide 110R, 110L. With the third guide 310, however, with the third guide 310 partially coincident with the second projection 120R, 120L, the rear end of the sheet 9 is suppressed by the third guide 310 from above and prevented from floating outside the guidable range of the first guide 110R, 110L but can be directed to the feed roller 7A securely (see FIG. 9).

According to the image reading apparatus 1 described above, furthermore, the opening cover 90 covers the opening 99 when the image reading apparatus 1 is not in use and the second tray 200 is in the first position. Therefore, the opening cover 90 can prevent dirt and dust from entering inside the housing 8. According to the present disclosure, with the smaller-sized opening 99, a size of the opening cover 90 can also be reduced. Further, it can be prevented that the user unintentionally inserts fingers in the opening 99, and the fingers are caught or hurt by the opening cover 90 as the second tray 200 swings open.

Although an example of carrying out the disclosure have been described, those skilled in the art will appreciate that there are numerous variations and permutations of the sheet stackable device that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the first tray 100 may not necessarily be formed integrally with the internal frame 8F being a part of the housing 8 but may be separately formed from the housing 8.

For another example, the first guide 110R, 110L may not necessarily be situated within the first tray 100 but may be formed to extend partially over the second tray 200. Similarly, the second guide 210R, 210L may not necessarily be situated within the second tray 200 but may be formed to extend partially over the first tray 100.

For another example, the joint 80R, 80L may not necessarily be configured with the bifurcated portion 230R, 230L with the round hole 230A, in which the interpolated portion 130R, 130L is inserted. The joint 80R, 80L may not necessarily be formed to have the round hole 230A in the bifurcated portion 130R, 130L or the shaft 130A in the interpolated portion 130R, 103L. Rather, for example, the bifurcated portion 230R, 230L may merely impose the interpolated portion 130R, 130L in between the two-split pieces.

What is claimed is:
1. A sheet stackable device, comprising:
a first tray comprising a first placement plane configured to form a part of a stackable plane and to receive placement of a sheet;
a second tray comprising a second placement plane configured to form a part of the stackable plane with the first placement plane, and a slider groove, the second tray being swingable, about a swing axis extending in parallel with an extending direction of the slider groove, between a first position and a second position, the first tray and the second tray being configured to form an opening between an edge of the first tray on a side of the swing axis and an edge of the second tray on a side of the swing axis when the second tray is in the first position;
a first guide arranged on the first placement plane;
a second guide arranged on the second placement plane and configured to slide along the slider groove in the extending direction;
a first projection provided in the second guide and formed to project from the second guide in a projecting direction orthogonal to the second placement plane; and
a joint configured to connect the first guide and the second guide rotatably with respect to each other, the first guide and the second guide being integrally slidable in the extending direction, a height of the joint from the second placement plane of the second tray in the projecting direction, when the second tray is in the second position, being smaller than a height of the first projection from the second placement plane of the second tray in the projecting direction,
wherein a second projection projecting in a second direction orthogonal with respect to the first placement plane is formed at one end of the first guide, the joint being provided at another end of the first guide.
2. The sheet stackable device according to claim 1, wherein the first projection projects in the projecting direction from the slider groove formed in the second tray in the projecting direction.
3. The sheet stackable device according to claim 1, wherein, when the second tray is in the first position, an upper edge of a part of the first guide extending from the joint downstream in a first direction orthogonal to the extending direction and to the projecting direction, and an oblique edge of the second guide extending from the first projection toward the joint in the second guide, extend in parallel with each other.
4. The sheet stackable device according to claim 1, further comprising:
an upper cover arranged in an upper position with respect to the first tray, the upper cover comprising a third guide arranged to be opposed to the first placement plane and configured to guide the sheet being conveyed from above when the second tray is in the second position, the second projection and the third guide coinciding with each other at least partially when viewed along the extending direction.
5. The sheet stackable device according to claim 4, wherein, when the second tray in the second position is viewed along the extending direction, the first projection is exposed from the upper cover and the stackable plane.

6. The sheet stackable device according to claim 1, further comprising
an opening cover configured to:
move in coordination with the swinging movement of the second tray,
cover the opening when the second tray is in the first position, and
retract in a lower position with respect to the second tray when the second tray is in the second position.

7. A sheet stackable device, comprising:
a first tray comprising a first placement plane configured to form a part of a stackable plane and to receive placement of a sheet;
a second tray comprising a second placement plane configured to form a part of the stackable plane with the first placement plane, and a slider groove, the second tray being swingable, about a swing axis extending in parallel with an extending direction of the slider groove, between a first position and a second position, the first tray and the second tray being configured to form an opening between an edge of the first tray on a side of the swing axis and an edge of the second tray on a side of the swing axis when the second tray is in the first position;
a first guide arranged on the first placement plane;
a second guide arranged on the second placement plane and configured to slide along the slider groove in the extending direction;
a first projection provided in the second guide and formed to project from the second guide in a projecting direction orthogonal to the second placement plane;
a joint configured to connect the first guide and the second guide rotatably with respect to each other, the first guide and the second guide being integrally slidable in the extending direction, a height of the joint from the second placement plane of the second tray in the projecting direction, when the second tray is in the second position, being smaller than a height of the first projection from the second placement plane of the second tray in the projecting direction; and
an upper cover arranged in an upper position with respect to the first tray,
wherein, when the second tray in the second position is viewed along the extending direction, the first projection is exposed from the upper cover and the stackable plane.

8. The sheet stackable device according to claim 7, further comprising an opening cover configured to:
move in coordination with the swinging movement of the second tray;
cover the opening when the second tray is in the first position; and
retract in a lower position with respect to the second tray when the second tray is in the second position.

9. A sheet stackable device, comprising:
a first tray comprising a first placement plane configured to form a part of a stackable plane and to receive placement of a sheet;
a second tray comprising a second placement plane configured to form a part of the stackable plane with the first placement plane, and a slider groove, the second tray being swingable, about a swing axis extending in parallel with an extending direction of the slider groove, between a first position and a second position, the first tray and the second tray being configured to form an opening between an edge of the first tray on a side of the swing axis and an edge of the second tray on a side of the swing axis when the second tray is in the first position;
a first guide arranged on the first placement plane;
a second guide arranged on the second placement plane and configured to slide along the slider groove in the extending direction;
a first projection provided in the second guide and formed to project from the second guide in a projecting direction orthogonal to the second placement plane; and
a joint configured to connect the first guide and the second guide rotatably with respect to each other, the first guide and the second guide being integrally slidable in the extending direction, a height of the joint from the second placement plane of the second tray in the projecting direction, when the second tray is in the second position, being smaller than a height of the first projection from the second placement plane of the second tray in the projecting direction,
wherein the second guide comprises a bifurcated portion extending from the first projection in two-split pieces at one end of the second guide, the joint being provided at the same end of the second guide as the bifurcated portion,
wherein the first guide comprises an interpolated portion being insertable in a position between the two-split pieces in the bifurcated portion, at one end of the first guide, the joint being provided at another end of the first guide, and
wherein the joint includes the bifurcated portion of the second guide and the interpolated portion of the first guide.

10. The sheet stackable device according to claim 9, wherein the first guide further comprises:
a restrictive portion configured to restrict the widthwise position of the sheet in the extending direction, in a part of the first guide closer to the one end with respect to the interpolated portion, and
a connecting portion configured to connect the interpolated portion and the restrictive portion with each other, the connecting portion being curved in a shape of a crank.

11. The sheet stackable device according to claim 9, further comprising an opening cover configured to:
move in coordination with the swinging movement of the second tray;
cover the opening when the second tray is in the first position; and
retract in a lower position with respect to the second tray when the second tray is in the second position.

* * * * *